United States Patent
Droux et al.

(10) Patent No.: US 8,254,261 B2
(45) Date of Patent: Aug. 28, 2012

(54) METHOD AND SYSTEM FOR INTRA-HOST COMMUNICATION

(75) Inventors: Nicolas G. Droux, San Jose, CA (US); Sunay Tripathi, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 349 days.

(21) Appl. No.: 12/580,382

(22) Filed: Oct. 16, 2009

(65) Prior Publication Data

US 2011/0090915 A1  Apr. 21, 2011

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 1/10 | (2006.01) |
| H04J 3/08 | (2006.01) |
| H04J 3/24 | (2006.01) |
| H04J 3/14 | (2006.01) |
| H04L 1/00 | (2006.01) |
| H04L 12/26 | (2006.01) |
| H04L 12/50 | (2006.01) |
| H04L 12/28 | (2006.01) |
| H04L 12/56 | (2006.01) |
| H04B 7/14 | (2006.01) |
| H04W 4/00 | (2009.01) |
| H04Q 11/00 | (2006.01) |
| G06F 15/16 | (2006.01) |
| G06F 15/173 | (2006.01) |
| G06F 15/177 | (2006.01) |

(52) U.S. Cl. ........ 370/237; 370/238; 370/315; 370/334; 370/349; 370/359; 370/390; 370/392; 370/395.32; 370/402; 709/220; 709/225; 709/229; 709/232; 709/239

(58) Field of Classification Search .................. None
See application file for complete search history.

(56) References Cited

U.S. PATENT DOCUMENTS

| | | | |
|---|---|---|---|
| 6,041,053 | A | 3/2000 | Douceur et al. |
| 6,070,219 | A | 5/2000 | McAlpine et al. |
| 6,131,163 | A | 10/2000 | Wiegel |
| 6,163,539 | A | 12/2000 | Alexander et al. |

(Continued)

OTHER PUBLICATIONS

Dovrolis, C., Thayer, B. and Ramanathan, P: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Nishant B Divecha
(74) *Attorney, Agent, or Firm* — Osha Liang LLP (57) ABSTRACT

A system including first and second virtualized execution environments and a hypervisor for sending packets between virtualized execution environments. The first virtualized execution environment includes a first VNIC associated with a first hardware address (HA), a first proxy VNIC associated with a second HA, and a virtual switch. A Vswitch table for the virtual switch includes entries associating the first HA with the first VNIC and the second HA with the first proxy VNIC. The second virtualized execution environment includes a second proxy VNIC associated with the first HA. The virtual switch receives a first packet associated with the second HA. The virtual switch sends the first packet to the first proxy VNIC when Vswitch table entry associates the second HA with the first proxy VNIC. The first VNIC proxy sends the first packet from the first virtualized execution environment to the second virtualized execution environment using the hypervisor.

12 Claims, 5 Drawing Sheets

U.S. PATENT DOCUMENTS

| | | |
|---|---|---|
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,146,431 B2 | 12/2006 | Hipp et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2002/0052972 A1 | 5/2002 | Yim |
| 2003/0037154 A1 | 2/2003 | Poggio et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |
| 2008/0002683 A1* | 1/2008 | Droux et al. ............ 370/389 |
| 2009/0129385 A1* | 5/2009 | Wray et al. ............. 370/392 |
| 2010/0054260 A1* | 3/2010 | Pandey et al. ........ 370/395.53 |
| 2010/0107162 A1* | 4/2010 | Edwards et al. ............ 718/1 |
| 2010/0131636 A1* | 5/2010 | Suri et al. ............... 709/224 |
| 2010/0232443 A1* | 9/2010 | Pandey ................... 370/401 |
| 2011/0035494 A1* | 2/2011 | Pandey et al. ........... 709/224 |

OTHER PUBLICATIONS

Tripathi, S.: "Crossbow: Network Virtualization and Resource Control"; presented at Sun Labs Open House; Jun. 1, 2006; 27 pages.

"Solaris Networking—The Magic Revealed (Part 1)"; Sunay Tripathi's Solaris Networking Weblog; Nov. 14, 2005, pp. 1-22 (22 pages).

Tripathi, S.; "Crossbow: Network Virtualization and Resource Control"; Presentation to Sun Labs Open House; Jun. 1, 2006; (22 pages).

Belgaied, K. et al.; "Crossbow Hardware Resources Management and Virtualization"; Sep. 28, 2007; 14 pages.

Droux, N.; "Crossbow Network Virtualization Architecture"; Aug. 28, 2007; Solaris Core OS, Sun Microsystems, Inc.; 51 pages.

Khare, S.; "VLANs as VNICs"; Solaris Networking, Sun Microsystems, Inc.; Aug. 13, 2007; 9 pages.

Tripathi, S.; "Data Path: Soft Ring Set (SRS) and Soft Rings for Dynamic Polling & Parallelization"; Jul. 23, 2007; 7 pages.

Droux, N.; "Virtual Switching in Solaris"; Solaris Networking, Sun Microsystems, Inc.; Apr. 2, 2007; 6 pages.

Tripathi, S.; "Crossbow Architectural Document"; Nov. 21, 2006; 19 pages.

Nordmark, E., et al.; "IP Instances Interface Document"; PSARC 2006/366; Dec. 28, 2006; 18 pages.

Nordmark, E.; "IP Instances Design Document"; PSARC 2006/366; Dec. 21, 2006; 38 pages.

Tripathi, S.; "Crossbow: Solaris Network Virtualization & Resource Control"; Aug. 23, 2006; 13 pages.

Droux, N.; "Crossbow: Network Virtualization and Bandwidth Partitioning"; presented at CHOSUG, Jun. 19, 2007; 23 pages.

Nordmark; E.; "IP Instances—Network Isolation Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

http://www.cisco.com/en/US/solutions/collateral/ns340/ns517/ns224/ns783/white_paper_c11-462422.html, 2008, Cisco: Data Center Ethernet: Cisco's Innovation for Data Center Networks; 8 pages.

* cited by examiner

METHOD AND SYSTEM FOR INTRA-HOST COMMUNICATION

BACKGROUND

Network traffic is transmitted over a network, such as the Internet, from a sending system (e.g., computer system) to a receiving system (e.g., computer system) via a physical network interface card (NIC). A NIC is a hardware device found in a typical computer system that allows for the sending and receiving of network traffic. Typically, network traffic is transmitted in the form of data packets, where each data packet includes a header and a payload. The payload contains information regarding the source address, destination address, size, transport protocol used to transmit the data packet, and various other information associated with the data packet. The payload contains the actual data to be transmitted to the receiving system.

Virtualization technology allows multiple execution environments to concurrently execute on a single physical system. In such cases, the data transferred between the various execution environments may be performed using a virtualized network infrastructure.

SUMMARY

In general, in one aspect, the invention relates to a system. The system includes a first virtualized execution environment on a host. The first virtualized execution environment includes a first virtual network interface card (VNIC) associated with a first hardware address (HA). The first virtualized execution environment further includes a first proxy VNIC associated with a second HA. The first virtualized execution environment further includes a virtual switch. The first VNIC and the first proxy VNIC are associated with the virtual switch. Further, the virtual switch is associated with a Vswitch table. The Vswitch table includes an entry associating the first HA with the first VNIC and an entry associating the second HA with the first proxy VNIC. The system further includes a second virtualized execution environment on the host. The second virtualized execution environment includes a second proxy VNIC associated with the first HA. The system further includes a hypervisor executing on the host. The hypervisor is configured to send packets between the first and second virtualized execution environments. Accordingly, the virtual switch is configured to receive a first packet associated with the second HA. The virtual switch is further configured to send the first packet to the first proxy VNIC when an entry in the Vswitch table associates the second HA with the first proxy VNIC. The first VNIC proxy is configured to receive the first packet from the first VNIC when the first VNIC determines that the entry in the Vswitch table associates the second HA with the first proxy VNIC. The first VNIC proxy is further configured to send the first packet from the first virtualized execution environment to the second virtualized execution environment using the hypervisor.

In general, in one aspect, the invention relates to a method for intra-host communication. The method involves receiving, by a VNIC, a first packet associated with a first hardware address (HA). The method further involves sending the first packet to a proxy VNIC when an entry in a Vswitch table associates the first HA with the proxy VNIC. The Vswitch table is associated with a virtual switch. The VNIC, the proxy VNIC, and virtual switch are executing in a first virtualized execution environment of a host. The proxy VNIC is configured to send the first packet to a second virtualized execution environment of the host using a hypervisor executing on the host.

In general, in one aspect, the invention relates to a computer readable medium comprising software instructions for performing a method for intra-host communication. The method involves receiving, by a VNIC, a first packet associated with a first hardware address (HA). The method further involves sending the first packet to a proxy VNIC when an entry in a Vswitch table associates the first HA with the proxy VNIC. The Vswitch table is associated with a virtual switch. The VNIC, the proxy VNIC, and virtual switch are executing in a first virtualized execution environment of a host. The proxy VNIC is configured to send the first packet to a second virtualized execution environment of the host using a hypervisor executing on the host.

Other aspects of the invention will be apparent from the following description and the appended claims.

DETAILED DESCRIPTION

Specific embodiments of the invention will now be described in detail with reference to the accompanying figures (referenced to as Figure and FIG.). Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for intra-host communication.

In one or more embodiments of the invention, a virtualized execution environment may be a virtual machine. A virtual machine (i.e., VM) is an isolated software execution environment hosted on a computer system (i.e., host computer system or, more generally, "host"). In particular, a VM is configured to simulate the execution of a process as if the process was executing on a physical computing device. Further, each VM may include an instance of an operating system. The operating system executing on a virtual machine may or may not be the same as a host operating system for the host computer system. Accordingly, a host computer system may serve as host to multiple VMs where each VM is associated with a distinct operating system instance and therefore a distinct kernel.

In view of the above, intra-host communication in accordance with one or more embodiments of the invention may involve communication (e.g., the transmission of data packets) between: (i) a first and a second virtual machine; (ii) a virtual machine and a host operating system; and (iii) a virtual machine and hardware for the host computer system. Further, in one or more embodiments of the invention, a hypervisor may be used to facilitate intra-host communication as described above. Specifically, a hypervisor may be any communication mechanism implemented on a host computer system to facilitate the aforementioned intra-host communication.

As mentioned above, embodiments of the invention may be utilized in a variety of virtual machine architectures. For example, one or more embodiments of the invention may be implemented on a VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. Examples of exemplary architectures include, but are not limited to, VMware® and Xen®. VMware® is a registered trademark of VMware, Inc. Xen® is a trademark overseen by the Xen Project Advisory Board.

Figure 1:
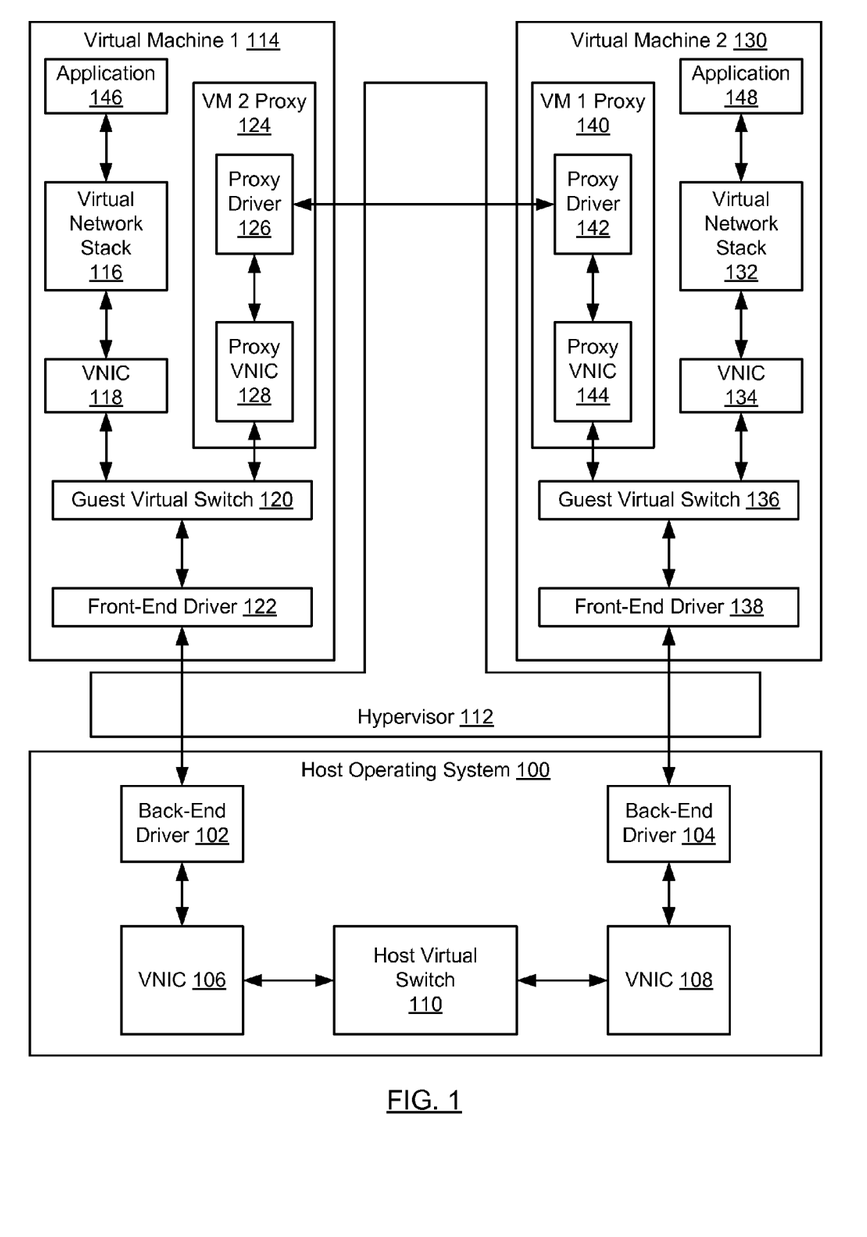
FIG. 1 shows a system in accordance with one or more embodiments of the invention.

FIG. 1 shows a system in accordance with one or more embodiments of the invention. Specifically, FIG. 1 shows components of a host computer system, including a host operating system (100), a hypervisor (112), and two virtual machines (114, 130). Further, the host computer system is operatively connected to a physical NIC (not shown) for purposes of sending data packets to and receiving data packets from a network (not shown).

In one or more embodiments of the invention, a host operating system (100) is configured to process and subsequently forward data packets initially received by the physical NIC (not shown) to any one of a number of virtualized execution environments (114, 130) operatively connected to the host operating system (100) using a VNIC (106, 108). Further, in one or more embodiments of the invention, the host operating system (100) is configured to send data packets across a network to other host computer systems (not shown) using the physical NIC (not shown). In one or more embodiments of the invention, the host operating system (100) includes at least one host virtual switch (110), at least two VNICs (106, 108), and at least two instances of a back-end driver (102, 104) in correspondence with the aforementioned VNICs (106, 108).

In one or more embodiments of the invention, a VNIC (106, 108) includes the functionality of a physical NIC (not shown). Accordingly, a VNIC (106, 108) is configured to send and receive data packets from the hardware of a host computer system (not shown). Further, a VNIC (106, 108) is configured to receive and send data packets from a virtual machine (114, 130) via a back-end driver (102, 104).

In one or more embodiments of the invention, a back-end driver (102, 104) is configured to send a data packet from a host VNIC (106, 108) to a virtualized execution environment (e.g., virtual machines (114, 130) as shown in FIG. 1). In addition, the back-end driver (102, 104) is configured to receive a data packet sent to the host operating system (100) from a virtualized execution environment (114, 130). Specifically, in performing these data packet transport functions, the back-end driver (102, 104) is configured to interface with the hypervisor (112).

The number of VNIC and instantiated back-end driver pairs executing in the host operating system (100) corresponds with the number of virtualized execution environments operatively connected to the host operating system (100). For example, FIG. 1 shows a first and a second virtual machine (114, 130) operatively connected to the host operating system (100). Accordingly, the depicted host operating system (100), as shown in FIG. 1, includes: (i) a first host VNIC (106) and a back-end driver instance (102) corresponding with the first virtual machine (114); and (ii) a second host VNIC (108) and a back-end driver instance (104) corresponding with the second virtual machine (130).

In one or more embodiments of the invention, a virtual switch (110, 120, 136) is configured to determine a packet destination based on a hardware address for the data packet. As such, in accordance with one or more embodiments of the invention, a virtual switch is a mechanism to create a virtual network within a host, where the virtual network includes two or more virtual machines (or packet destinations) operatively connected to the virtual switch. This is accomplished by maintaining a virtual switch table (i.e., Vswitch table) which effectively associates each of the operatively-connected virtual machines with a respective hardware address. Accordingly, for a particular hardware address, an appropriate packet destination may be determined. As such, the virtual switch restricts communication within the host such that only virtual machines (or packet destinations) operatively connected to the virtual switch may communicate with each other. Said another way, a virtual machine (or packet destination) is not able to communicate with another virtual machine (or packet destination) on the host unless the other virtual machine (or packet destination) is connected to the same virtual switch.

In one or more embodiments of the invention, a virtual switch may be implemented as described in U.S. patent application Ser. No. 11/480,261, which is hereby incorporated by reference. Additionally, in one or more embodiments of the invention, an entry may also include pointers to any data structures that are maintained in correspondence with the particular VNIC. Further, in one or more embodiments of the invention, the aforementioned VNIC data structure may include a function to execute for purposes of sending a data packet to the VNIC.

In one or more embodiments of the invention, a virtual machine (114, 130) includes a front-end driver (122, 138), a guest virtual switch (120, 136), a guest VNIC (118, 134), a guest virtual network stack (116, 132), an application layer (146, 148), and at least one proxy (124, 140) to a second virtual machine.

In one or more embodiments of the invention, a front-end driver (122, 138) is configured to send a data packet from a virtualized execution environment (e.g., virtual machines (114, 130) as shown in FIG. 1) to the host operating system (100). In addition, the front-end driver (122, 130) is configured to receive a data packet sent to a virtualized execution environment (114, 130) from the host operating system (100). Specifically, in performing these data packet transport functions, the front-end driver (122, 138) is configured to interface with the hypervisor (112).

In one or more embodiments of the invention, a guest VNIC (118, 134) and a guest virtual switch (120, 136) perform functions analogous to those of a virtual switch and VNIC instantiated on a host operating system. Accordingly, in one or more embodiments of the invention, a guest VNIC (118, 134) includes the functionality of a physical NIC. Accordingly, a guest VNIC (118, 134) is configured to send and receive data packets from a virtual network stack (116, 132

In one or more embodiments of the invention, a guest virtual switch (120, 136) is configured to determine a packet destination based on a hardware address for the data packet. As described in relation to a virtual switch (110) instantiated in a host operating system (100), a guest virtual switch (120, 136) is similarly used as a mechanism to create a virtual network within a host, where the virtual network includes two or more virtual machines (114, 130) operatively connected to the guest virtual switch (120, 136). This is accomplished by maintaining a virtual switch (e.g., vswitch) table, which effectively associates each of the operatively-connected virtual machines with a respective hardware address. Accordingly, for a particular hardware address, an appropriate packet destination may be determined. As such, the guest virtual switch (120, 136) restricts communication within the host such that only virtual machines (114, 130) operatively connected to the guest virtual switch (120, 136) may communicate with each other.

In one or more embodiments of the invention, a guest virtual network stack (116, 132) includes an Internet Protocol (IP) layer, inbound and outbound virtual serialization queues, and a transport layer. The IP layer, for example, is configured to perform IP level processing for both inbound and outbound data packets. The inbound virtual serialization queue is a queue data structure configured to receive data packets from the IP layer prior to the data packets being processed by the transport layer. The transport layer is configured to process inbound and outbound data packets in accordance with Transmission Control Protocol (TCP), User Datagram Protocol (UDP), or both UDP and TCP. The outbound virtual serialization queue is a queue data structure configured to receive data packets from the VNIC (118, 134) with which the guest virtual network stack is associated.

In one or more embodiments of the invention, an application (146, 148) is configured to generate, send, and receive data packets to and from virtualized execution environments (114, 130) of the host or other computer systems (not shown) connected over a network. The application may include an operating system process or any user-level software (e.g., word processing, web browsing, file sharing, spreadsheet, multimedia, code compilation, etc.).

In one or more embodiments of the invention, a proxy (124, 140) to a second virtual machine is configured to send and receive data packets between a first virtualized execution environment (e.g., where the proxy is executing) and a second virtualized execution environment belonging to the same host computer system. In one or more embodiments of the invention, the proxy (124, 140) includes a proxy VNIC (128, 144) and a proxy driver (126, 142).

In one or more embodiments of the invention, a proxy VNIC (128, 144) is configured to facilitate data packet transport between a first virtualized execution environment and a second virtualized execution environment. Accordingly, a proxy VNIC (128, 144) is configured to send and receive data packets from a guest virtual network stack (116, 132). A proxy VNIC (128, 144) is further configured to send and receive data packets from a virtual machine (114, 130) via a proxy driver (126, 142).

In one or more embodiments of the invention, a proxy driver (126, 142) is configured to send a data packet from one virtualized execution environment to another. Specifically, in performing these data packet transport functions, the proxy driver (126, 142) is configured to interface with the hypervisor (112).

While FIG. 1 explicitly shows virtual machines (114, 130) as used under a Xen® architecture, any virtualized execution environment architecture may be used where each virtualized execution environment is associated with a distinct kernel. Accordingly, in accordance with one or more embodiments of the invention, the components described above in relation to FIG. 1 may be similarly utilized with, for example, a VMware® architecture.

Embodiments of the invention enable intra-host communication allowing a data packet to be transmitted from one virtualized execution environment (114, 130) to another without any requirement of intermittent processing by a host operating system (100). This is achieved, in part, through (i) the assignment of hardware addresses to various components in the host computer system and (ii) the usage of virtual switching to facilitate receiving and forwarding of data packets based on a hardware address for the data packet. In applying this concept to the host computer system shown in FIG. 1, assume that Virtual Machine 1 (114) has a hardware address (e.g., a media access control (MAC) address) of HA1 and that Virtual Machine 2 (130) has a hardware address of HA2. As such, a data packet sent to Virtual Machine 1 (114) will be addressed to the HA1 hardware address whereas a data packet sent to Virtual Machine 2 (130) will be addressed to the HA2 hardware address.

To facilitate the intra-host routing of data packets based on hardware address, VNIC instances are assigned hardware addresses to properly align with packet destinations in the same data path. Further, virtual switches are similarly configured to determine a VNIC for sending a data packet to based on a specified hardware address for the data packet. These requirements are met for components of the invention instantiated not only in the host operating system (100) but in the virtualized execution environments (114, 130) as well.

For example, in the host operating system (100), VNIC (106) corresponds with Virtual Machine 1 (114). Accordingly, VNIC (106) is assigned a hardware address of HAL Similarly, because VNIC (108) corresponds with Virtual Machine 2 (130), VNIC (108) is assigned a hardware address of HA2. Further, the host virtual switch (110) which is operatively connected to the aforementioned VNICs (106, 108) is appropriately configured to enable routing of data packets based on hardware addresses. To this end, a virtual switch table for the host virtual switch (110) includes entries which effectively link each of the operatively connected VNICs (106, 108) with their respectively-assigned hardware addresses. For example, hardware address HA1 is associated in the virtual switch table with VNIC (106). Similarly, hardware address HA2 is associated in the virtual switch table with VNIC (108). By maintaining the virtual switch table this way, the host virtual switch (110) may be utilized to determine which VNIC (106, 108) to forward a data packet to based on a hardware address specified for the data packet.

Further, proxy VNIC (128) is associated with HA2 and proxy VNIC (144) is associated with HAL In addition, a virtual switch table for the guest virtual switch (120) includes an entry linking proxy VNIC (128) with HA2 and a virtual switch table for the guest virtual switch (136) includes an entry linking proxy VNIC (144) with HA1.

Figure 2:
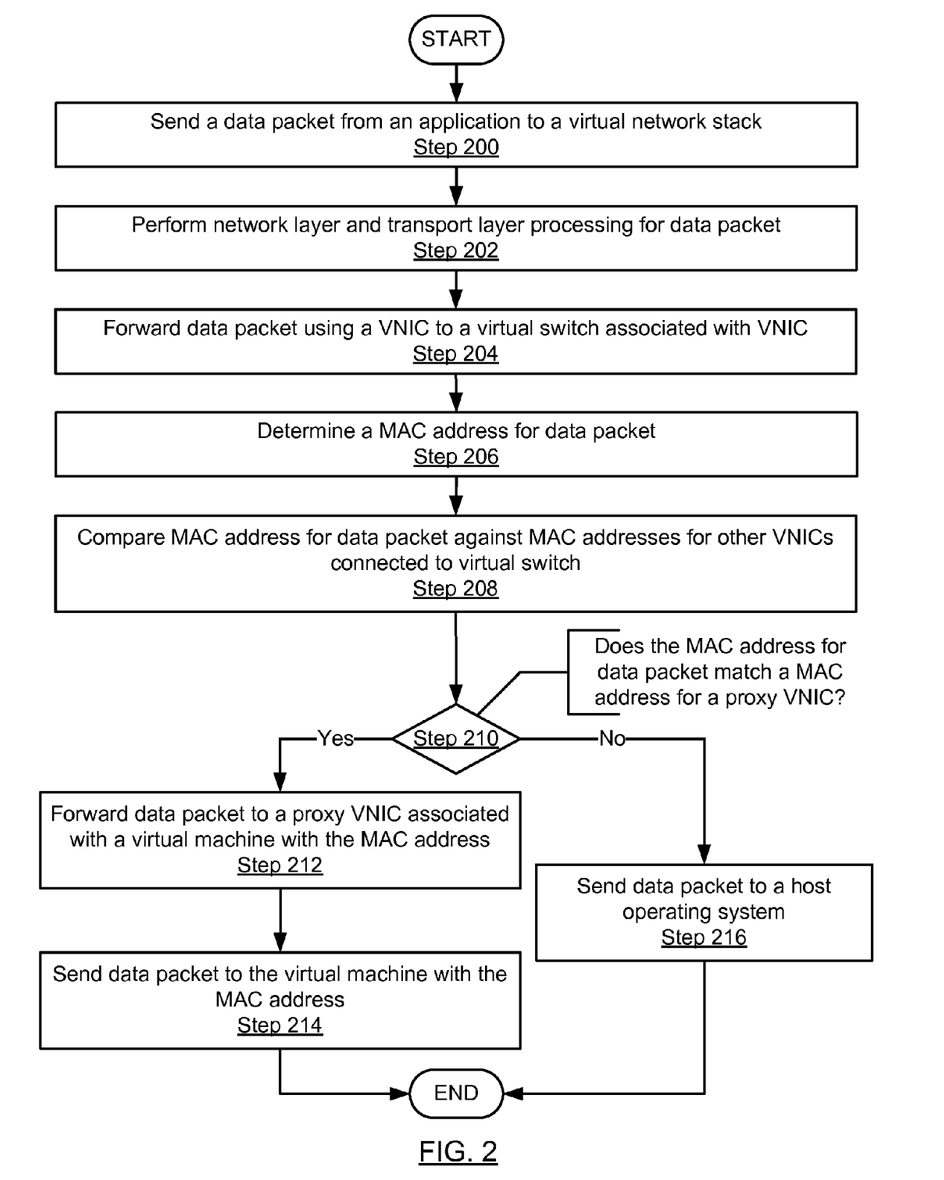
FIGS. 2-4 show a flowchart in accordance with one or more embodiments of the invention.
Figure 3:
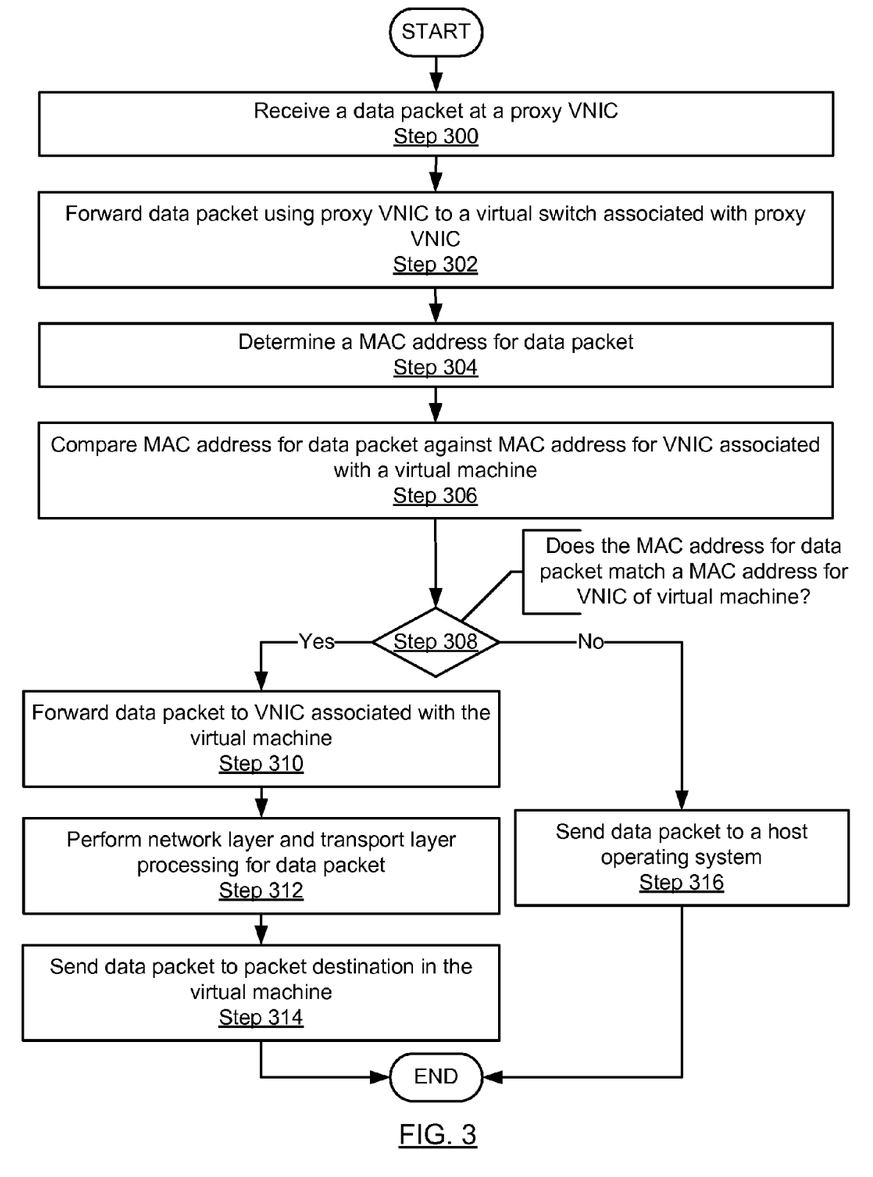
Figure 4:
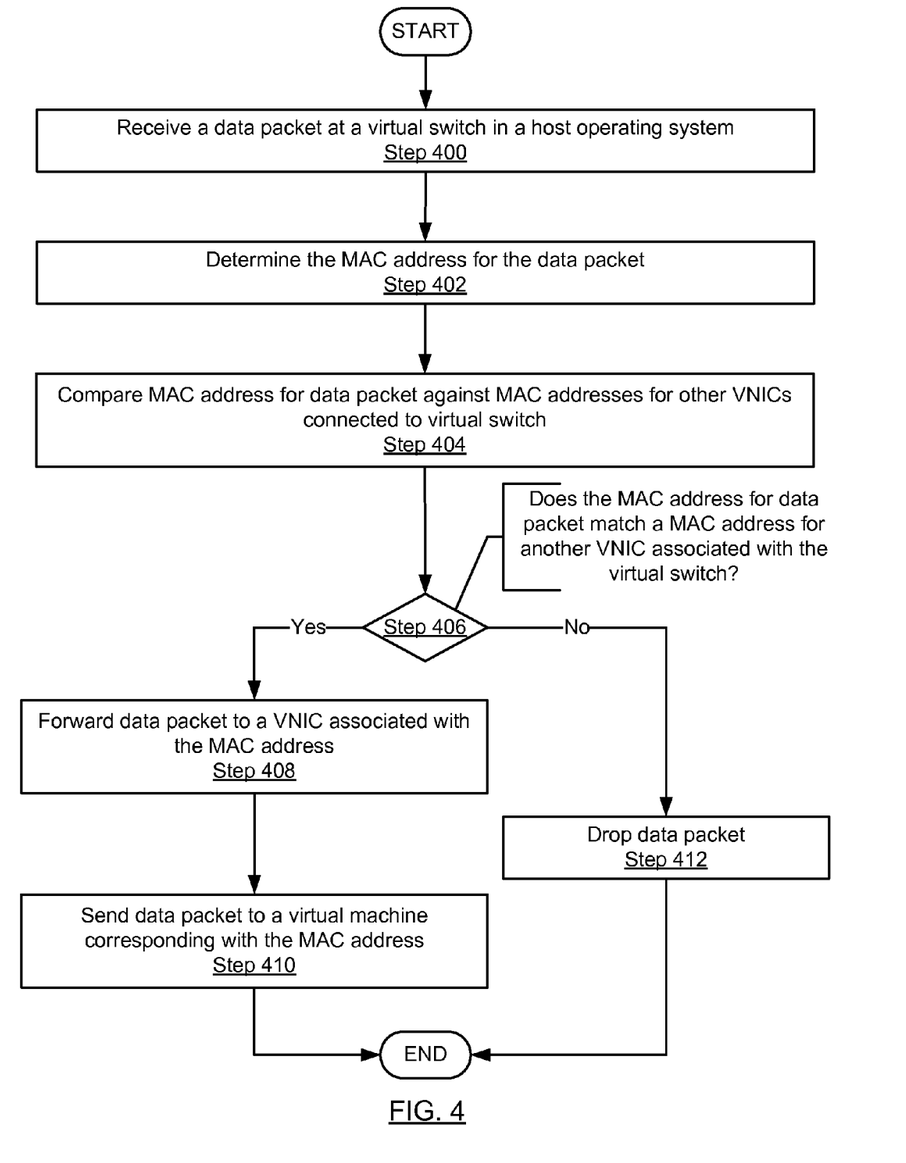

FIGS. 2-4 show a flowchart in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel.

Referring to FIG. 2, the process shown in FIG. 2 may be used, for example, to send a data packet from the application layer of a virtual machine. In Step 200, a data packet is sent from the application layer of a first virtual machine to a virtual network stack for the first virtual machine. In one or more embodiments of the invention, the data packet is addressed with a hardware address (e.g., MAC address) representing a particular packet destination. In one or more embodiments of the invention, the data packet may generated by an application.

In Step 202, the data packet received at the virtual network stack of the first virtual machine is processed in accordance with network layer and transport layer protocols. In Step 204, the data packet is forwarded using a VNIC to a virtual switch associated with the VNIC. In Step 206, a hardware address is determined for the data packet using the addressing information for the data packet.

In Step 208, the hardware address for the data packet is compared against the hardware addresses for the VNICs associated with the virtual switch. In Step 210, a determination is made as to whether there is a matching hardware address among the associated VNICs. If there is a matching hardware address, Step 212 is executed next. Otherwise, if there is not a matching hardware address among the associated VNICs, Step 216 is executed next.

In Step 212, the data packet is forwarded to a proxy VNIC executing on the first virtual machine when the hardware address for the proxy VNIC is determined a match from the Vswitch table in Steps 208 and 210.

In Step 214, the data packet is sent to a destination virtual machine corresponding to the proxy VNIC. In one or more embodiments of the invention, a proxy driver associated with the proxy VNIC is used in sending the data packet to the corresponding destination virtual machine Specifically, the proxy driver interfaces with the hypervisor of the host computer system.

In Step 216, the data packet is sent from the first virtual machine to a host operating system when the virtual switch's Vswitch table does not include a match for the destination hardware address specified by the data packet. In one or more embodiments of the invention, a front-end driver associated with the first virtual machine is used in sending the data packet to the host operating system. Specifically, the front-end driver interfaces with the hypervisor of the host.

The process shown in FIG. 3 may be used, for example, to receive a data packet at a second virtual machine from a first virtual machine Specifically, the process shown in FIG. 3 is an example of data packets sent directly from one virtual machine to another without requiring any intermittent processing by a host operating system.

In Step 300, a data packet is received from a first virtual machine at a proxy VNIC for a second virtual machine. In one or more embodiments of the invention, the data packet is addressed with a hardware address representing a particular packet destination. In Step 302, the data packet is forwarded using the proxy VNIC to a virtual switch associated with the proxy VNIC.

In Step 304, a hardware address (e.g., MAC address) is determined for the data packet using the addressing information for the data packet. In Step 306, the hardware address for the data packet is compared against the hardware addresses for the VNICs associated with the virtual switch. In Step 308, a determination is made as to whether there is a matching hardware address among the associated VNICs. If there is a matching hardware address, Step 310 is executed next. Otherwise, if there is not a matching hardware address among the associated VNICs, Step 316 is executed next.

In Step 310, the data packet is forwarded to a VNIC executing on the first virtual machine when the hardware address for the VNIC is determined as a match for the hardware address of the data packet in Steps 306 and 308.

In Step 312, the data packet received at a virtual network stack of the first virtual machine is processed in accordance with network layer and transport layer protocols. In Step 314, the data packet is sent to its intended packet destination. In one or more embodiments of the invention, the packet destination may be an operating system or a user-level application executing on the first virtual machine.

In Step 316, the data packet is sent from the first virtual machine to a host operating system when the virtual switch's Vswitch table did not include a match for the destination hardware address specified by the data packet. In one or more embodiments of the invention, a front-end driver associated with the first virtual machine is used in sending the data packet to the host operating system. Specifically, the front-end driver interfaces with the hypervisor of the host computer system.

The process shown in FIG. 4 may be used, for example, to receive a data packet at a physical NIC operatively connected to a host operating system. In Step 400, a data packet is received by a virtual switch executing on a host operating system. In one or more embodiments of the invention, the data packet is addressed with a hardware address (e.g., MAC address) representing a particular packet destination. Further, in one or more embodiments of the invention, the data packet is initially received by a physical NIC operatively connected to the host computer system upon which the host operating system executes.

In Step 402, a hardware address (e.g., MAC address) is determined for the data packet using the addressing information for the data packet. In Steps 404 and 406, the hardware address for the data packet is compared against the hardware addresses for the VNICs associated with the virtual switch. If there is a matching hardware address among the associated VNICs, Step 408 is executed next. Otherwise, if there is not a matching hardware address among the associated VNICs, Step 412 is executed next.

In Step 408, the data packet is forwarded to a VNIC executing in the host operating system when the hardware address for the VNIC is determined as a match for the hardware address of the data packet in Steps 404 and 406. In Step 410, the data packet is sent to a virtual machine associated with the VNIC. In Step 412, the data packet is dropped (i.e., not sent to a packet destination) when the hardware address for the VNIC is not determined as a match for the hardware address of the data packet in Steps 404 and 406.

The following discussion relates to various embodiments of the invention and is not intended to limit the scope of the invention. Embodiments of the invention allow for intra-host communication that effectively allows a data packet to be transmitted from one virtualized execution environment to another without any requirement of intermittent processing by a host operating system. For example, intra-host communication facilitated by one or more embodiments of the invention steps may avoid at least the following intermittent steps: (i) transmission of the data packet from the first domain to a host operating system for the host computer system; (ii) processing of the data packet by the host operating system; and (iii) transmission of the processed data packet from the host operating system to the second domain. In lieu of performing the intermittent steps described above, embodiments of the invention utilize virtual switches to enable intra-host communication between domains executing on a common host computer system.

Alternatively, altering the aforementioned scenario to exclude the guest virtual switch (120) of the first virtual machine (114) necessitates extra processing and performance degradation in sending the data packet to its destination. Consider that, in the absence of the guest virtual switch (120) of the first virtual machine (114), the same data packet would require transmission from the first virtual machine (114) and through the hypervisor (112) for receipt by the host operating system (100). In being received by the host operating system (100), the data packet would be processed in the inbound virtual serialization queue of a first VNIC (106) associated with the first virtual machine (114), subject to destination address comparison by the host virtual switch (110) of the host operating system (100), and processed in the outbound virtual serialization queue of a second VNIC (108) associated with the second virtual machine (130) before the data packet is effectively prepared to leave the host operating system (100). Further, in being transmitted from the host operating system (100) to the second virtual machine (130), the data packet is again transmitted through the hypervisor (112) a second time before the data packet even reaches the second virtual machine (130).

Accordingly, in contrasting the aforementioned scenario which utilize and, alternatively, exclude the functionality of the virtual switch (120) in the execution environment of the virtual machine (114), the following is evident: (i) the utilization scenario (i.e., where a virtual switch is utilized at the virtual machine level) involves merely one pass through the hypervisor (112) versus two passes in the non-utilization scenario; (ii) the utilization use case does not require processing of the data packet in inbound and outbound virtual serialization queues as is necessary when the data packet is received at and transmitted from the host operating system (100).

Figure 5:
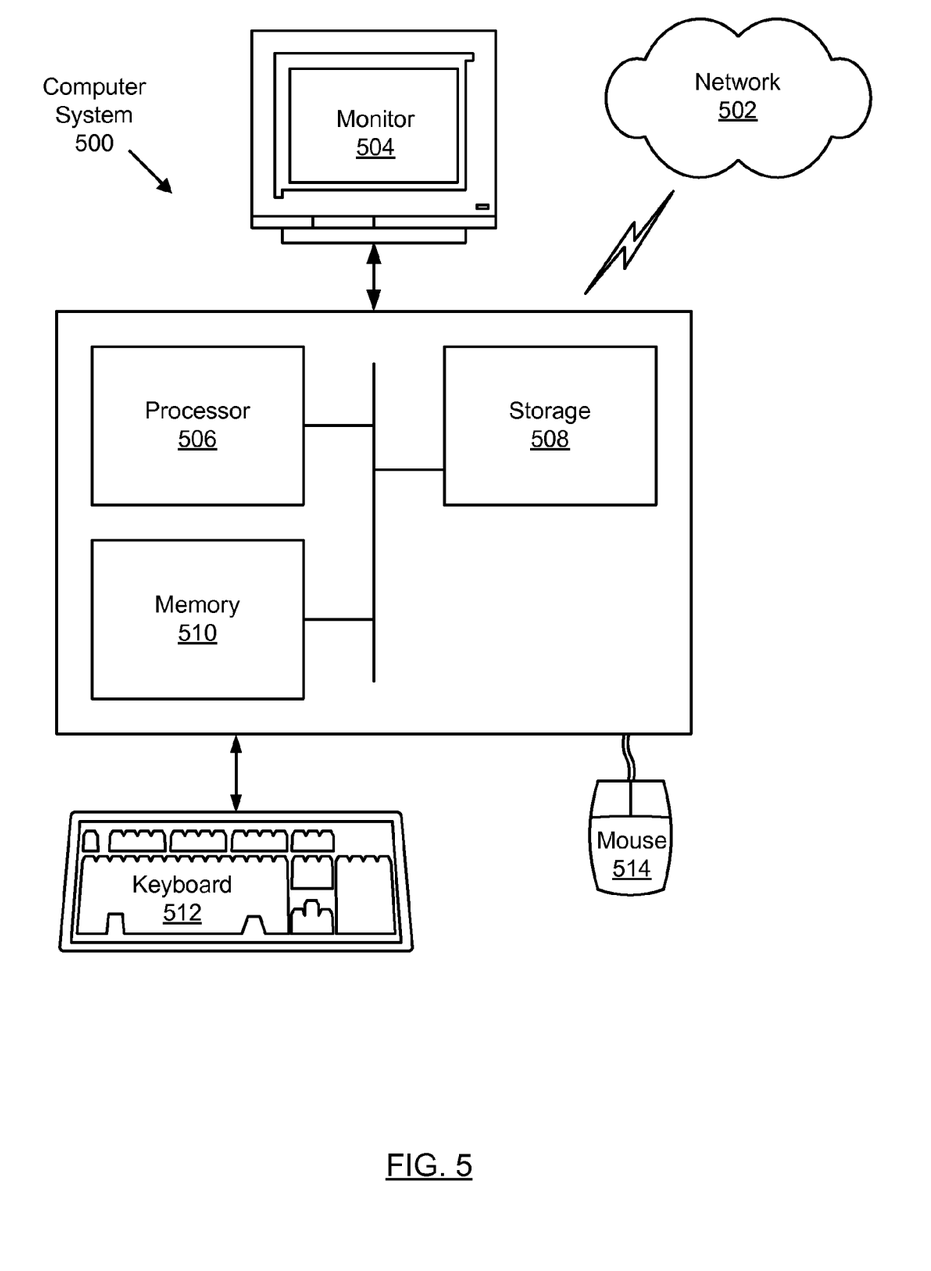
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processors (506), associated memory (510) (e.g., random access memory (RAM), cache memory, flash memory, etc.), a storage device (508) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (512), a mouse (514), or a microphone (not shown). Further, the computer (500) may include output means, such as a monitor (504) (e.g., a liquid crystal display (LCD), a plasma display, or cathode ray tube (CRT) monitor). The computer system (500) may be connected to a network (502) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a first virtual machine (VM) executing on a host, the first virtual machine sharing physical hardware resources of the host, comprising:
     a first Virtual Network Interface Card (VNIC) associated with a first hardware address (HA);
     a first VM proxy comprising a first proxy VNIC associated with a second HA and a first proxy driver; and
     a first virtual switch configured to couple the first VNIC and the first proxy VNIC, wherein the first virtual switch is associated with a first Vswitch table, wherein the first Vswitch table comprises an entry associating the first HA with the first VNIC and an entry associating the second HA with the first proxy VNIC;
   a second virtual machine executing on the host, the second virtual machine sharing the physical hardware resources of the host, comprising:
     a second VNIC associated with the second hardware address (HA);
     a second VM proxy comprising a second proxy VNIC associated with the first HA and a second proxy driver;
     a second virtual switch configured to couple the second VNIC and the second proxy VNIC, wherein the second virtual switch is associated with a second Vswitch table, wherein the second Vswitch table comprises an entry associating the second HA with the second VNIC and an entry associating the first HA with the second proxy VNIC; and
   a hypervisor executing on the host and configured to send packets between the first and second virtual machines, and wherein one of the first and second VM proxy is configured to only communicate packets to the other of the first and second VM proxy;
   wherein the first virtual switch is configured to:
     receive a first packet associated with the second HA, and
     send the first packet to the first proxy VNIC when an entry in the Vswitch table associates the second HA with the first proxy VNIC, and
   wherein the first proxy VNIC is configured to:
     receive the first packet from the first virtual switch when the first virtual switch determines that the entry in the first Vswitch table associates the second HA with the first proxy VNIC, and
     send the first packet to the first proxy driver wherein the first proxy driver is configured to send the first packet to the second proxy driver via the hypervisor;
   wherein the second proxy driver is configured to send the first packet to the second proxy VNIC;
   wherein the second proxy VNIC is configured to send the first packet to the second virtual switch;
   wherein the second virtual switch is configured to:
     receive the first packet associated with the second HA, and
     send the first packet to the second VNIC when an entry in the second Vswitch table associates the second HA with the second VNIC.

2. The system of claim 1, wherein the first virtual switch is further configured to: receive a second packet associated with a third HA, and send the second packet to a host operating system executing on the host when none of the entries in the Vswitch table associate the third HA with any VNIC.

3. The system of claim 1, further comprising: a physical network interface card (NIC) operatively connected to the host, wherein the physical NIC is interposed between a network and the host.

4. The system of claim 1, wherein first proxy VNIC is further configured to: receive a second packet associated with the first HA, and send the second packet to the first VNIC when the first Vswitch table comprise an entry that associates the first HA with the first VNIC.

5. The system of claim 1, wherein the first HA and the second HA are Media Access Control (MAC) addresses.

6. The system of claim 1, wherein the first Vswitch table, the first VNIC, and the first proxy VNIC are located in a MAC layer of the first virtual machine.

7. A method for intra-host communication, comprising:
configuring a first virtual machine (VM) on a host, wherein the first virtual machine is configured to share the resources of the host, wherein the configuring the first virtual machine on the host comprises configuring a first virtual switch of the first virtual machine to communicate with a first Virtual Network Interface Card (VNIC) and a first proxy VNIC of a first VM proxy;
configuring a second virtual machine on a host, wherein the second virtual machine is configured to share the resources of the host, wherein the configuring the second virtual machine on the host comprises configuring a second virtual switch of the second virtual machine to communicate with a second Virtual Network Interface Card (VNIC) and a second proxy VNIC of a second VM proxy;
configuring a hypervisor for communicating packets between a first proxy driver of the first VM proxy of the first virtual machine and a second proxy driver of the second VM proxy of the second virtual machine;
receiving, by the first VNIC, a first packet associated with a first hardware address (HA), wherein the first VNIC is configured to forward the first packet to the first virtual switch;
sending the first packet to the first proxy VNIC when an entry in a first Vswitch table of the first virtual switch associates the first HA with the first proxy VNIC wherein the first proxy VNIC is configured to forward the first packet to the first proxy driver;
sending, by the first proxy driver and via the hypervisor, the first packet to the second proxy driver of the second VM proxy;
wherein the second proxy driver is configured to forward the first packet, received via the hypervisor, to the second virtual switch via the second proxy VNIC;
sending the first packet to the second VNIC when an entry in a second Vswitch table of the second virtual switch associates the first HA with the second VNIC wherein the first VNIC, the first proxy VNIC, and the first virtual switch are executing in the virtual machine on the host, and wherein the second VNIC, the second proxy VNIC, and the second virtual switch are executing in the second virtual machine on the host; and wherein the hypervisor is executing on the host.

8. The method of claim 7, wherein the first HA is a Media Access Control (MAC) address.

9. The method of claim 7, wherein the first Vswitch table, the first VNIC, and the first proxy VNIC are located in a MAC layer of the first virtual machine.

10. A non-transitory computer readable storage medium comprising software instructions for performing a method for intra-host communication, the method comprising:
configuring a first virtual machine (VM) on a host, wherein the first virtual machine is configured to share the resources of the host, wherein the configuring the first virtual machine on the host comprises configuring a first virtual switch of the first virtual machine to communicate with a first Virtual Network Interface Card (VNIC) and a first proxy VNIC of a first VM proxy;
configuring a second virtual machine on a host, wherein the second virtual machine is configured to share the resources of the host, wherein the configuring the second virtual machine on the host comprises configuring a second virtual switch of the second virtual machine to communicate with a second Virtual Network Interface Card (VNIC) and a second proxy VNIC of a second VM proxy;
configuring a hypervisor for communicating packets between a first proxy driver of the first VM proxy of the first virtual machine and a second proxy driver of the second VM proxy of the second virtual machine;
receiving, by the first VNIC, a first packet associated with a first hardware address (HA), wherein the first VNIC is configured to forward the first packet to the first virtual switch;
sending the first packet to the first proxy VNIC when an entry in a first Vswitch table of the first virtual switch associates the first HA with the first proxy VNIC wherein the first proxy VNIC is configured to forward the first packet to the first proxy driver;
sending, by the first proxy driver and via the hypervisor, the first packet to the second proxy driver of the second VM proxy;
wherein the second proxy driver is configured to forward the first packet, received via the hypervisor, to the second virtual switch via the second proxy VNIC;
sending the first packet to the second VNIC when an entry in a second Vswitch table of the second virtual switch associates the first HA with the second VNIC wherein the first VNIC, the first proxy VNIC, and the first virtual switch are executing in the virtual machine on the host, and wherein the second VNIC, the second proxy VNIC, and the second virtual switch are executing in the second virtual machine on the host; and wherein the hypervisor is executing on the host.

11. The non-transitory computer readable storage medium of claim 10, wherein the first HA is a Media Access Control (MAC) address.

12. The non-transitory computer readable storage medium of claim 10, wherein the first Vswitch table, the first VNIC, and the first proxy VNIC are located in a MAC layer of the first virtual machine.

* * * * *